United States Patent [19]

Wilhelm

[11] Patent Number: 4,542,381
[45] Date of Patent: Sep. 17, 1985

[54] ADAPTIVE WINDOW CFAR APPARATUS

[75] Inventor: Randy L. Wilhelm, Mesa, Ariz.

[73] Assignee: Motorola, Inc., Schaumburg, Ill.

[21] Appl. No.: 432,881

[22] Filed: Oct. 5, 1982

[51] Int. Cl.$^4$ ............................................. G01S 7/34
[52] U.S. Cl. .................. 343/5 CF; 343/7 A
[58] Field of Search ................. 343/5 CF, 7 A, 5 DP, 343/5 CE, 17.1 R

[56] References Cited

U.S. PATENT DOCUMENTS

| | | | |
|---|---|---|---|
| 3,946,382 | 3/1976 | Kossiakoff et al. | 343/5 CF |
| 4,213,127 | 7/1980 | Cole | 343/5 CF |
| 4,249,177 | 2/1981 | Chen | 343/5 CF |

Primary Examiner—T. H. Tubbesing
Assistant Examiner—Mark Hellner
Attorney, Agent, or Firm—Jonathan P. Meyer

[57] ABSTRACT

A constant false alarm rate (CFAR) apparatus is responsive to detected transitions in the clutter signal level to remove certain range cells from the alarm threshold calculation process, whereby the CFAR detector retains maximum sensitivity in the vicinity of clutter transitions while avoiding increased false alarm rates. A transition detection apparatus searches for transitions in range cells preceding the threshold calculation window and controls switches which remove range cells from the threshold calculation as the transition is shifted into and through the threshold calculation window.

5 Claims, 10 Drawing Figures

ADAPTIVE WINDOW CFAR APPARATUS

FIELD OF THE INVENTION

The present invention relates, in general, to constant false alarm rate (CFAR) detectors for use in conjunction with radar systems. More particularly, the invention relates to an adaptive window CFAR apparatus for increasing the sensitivity of the detector near transitions between two levels of clutter in the radar signal.

BACKGROUND OF THE INVENTION

Constant false alarm rate (CFAR) radar detectors are well known in the art for maintaining a consistent probability of false target detection in various environments. The basic approach is to set an alarm threshold for a range cell under test by averaging the signal levels in adjacent range cells within a predetermined window centered on the cell under test.

Abrupt transitions between one level of clutter and another, for instance a transition from a grassy field to a grove of trees, are a particular problem for CFAR detectors. Pure range averaging detectors tend to alter the alarm threshold too slowly in response to abrupt clutter transitions and so to produce false detections. A "greatest-of" averaging technique obtains range averages from two windows, one on either side of the cell under test, and uses the greater of the two averages to set the threshold. This technique avoids false detections at abrupt transitions, but desensitizes the detector by excessively adjusting the threshold near such transitions. In addition, various adaptive CFAR detectors are available, but they are not directed at, nor do they solve the problem of clutter transitions.

SUMMARY OF THE INVENTION

Accordingly, it is an object of the present invention to provide an improved CFAR apparatus with increased sensitivity without increased false detections in the vicinity of clutter transitions.

It is a further object of the invention to provide an improved CFAR apparatus which detects clutter transitions and alters the window surrounding the cell under test in response thereto.

A particular embodiment of the present invention comprises a first range window preceding the cell under test and a second range window following the cell under test. In the absence of a detected transition, the range data units contained in each of the cells of the first and second windows are summed and multiplied by a threshold constant to yield the alarm threshold. A clutter transition detection apparatus comprises the first range window, a transition test cell preceding it, a third range window preceding that, a transition detection function generator and a transition detector. Clutter transitions are located by the apparatus and a series of switches are opened and closed according to a predetermined pattern to remove certain range cells in the first and second range windows from the threshold calculation. Simultaneously, the threshold constant is altered to reflect the number of range cells currently used in the calculation. Altering the window from which the alarm threshold is calculated in response to a detected transition allows maximum sensitivity near the transition while avoiding delayed response and false alarms.

These and other objects and advantages of the present invention will be apparent to one skilled in the art from the detailed description below taken together with the drawings.

DETAILED DESCRIPTION OF THE INVENTION

Referring now to FIGS. 1A through 1D, a clutter transition as seen by a CFAR apparatus is depicted in graphic form. The signal received by a CFAR apparatus comprises a plurality of range data units. Each range data unit has a signal power level attributable to objects reflecting the radar beam at that particular range and to electronic noise in the radar. For instance, referring to FIG. 1A, a first range data unit 10, which corresponds to a range R, has a signal power $S_1$ and a second range data unit 12, corresponding to a range R', has a signal power $S_2$. The range data units are shifted serially into and through the CFAR apparatus so that range data unit 12 will progress toward the origin along the range axis as range data units from greater ranges are shifted into the apparatus. The range data units are derived from the signal received by the radar antenna and may or may not be subjected to preliminary clutter rejection filtering prior to entering a CFAR apparatus.

Figure 1A:
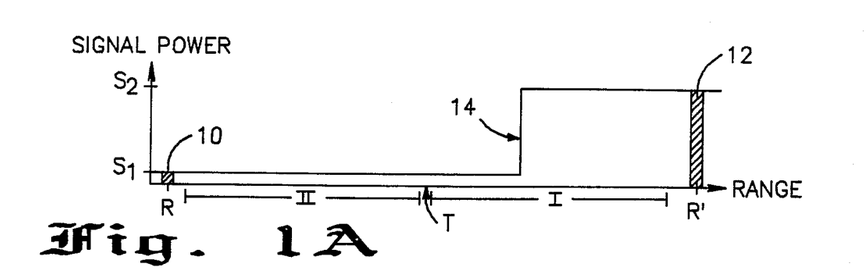
FIGS. 1A through 1D are plots of signal power versus range showing an idealized clutter block in various stages of passage through a pair of CFAR windows and a cell under test.

The purpose of a CFAR apparatus is to provide a predictable rate of false target detections by rejecting so-called clutter. In its broadest sense, clutter may be thought of as any return signal which does not represent a true target. To perform this function, CFAR systems calculate an alarm threshold based on the average signal power in the range data units surrounding the cell under test and indicate a detection only if the signal level in the cell under test exceeds the alarm threshold. The term *cell* or *range cell* is used herein to refer to a physical element of the CFAR apparatus, such as a digital data register or a tap on a delay line, through which range data units are shifted. In FIGS. 1A through 1D, cell under test T is surrounded by a first range window I comprising the sixteen range cells immediately preceding cell T and a second range window II comprising the sixteen range cells immediately following cell T. Range window I is said to precede cell T because range data units pass through it prior to entering cell T or window II, since it is at greater range. In FIG. 1A, a clutter transition 14, at which the clutter signal level changes from $S_1$ to $S_2$, has entered window I and is approaching cell under test T. The problem at this stage is to prevent premature upward bias of the alarm threshold resulting in decreased detector sensitivity. A pure average CFAR apparatus would average the range data units in all of the cells in windows I and II, which average would be weighted toward level $S_1$, thus setting the alarm threshold only slightly above $S_1$. A "greatest-of" CFAR apparatus would obtain the averages for windows I and II separately and use only that for window I, since it is the greater of the two, resulting in an alarm threshold significantly above level $S_1$ and decreased sensitivity.

Figure 1B:
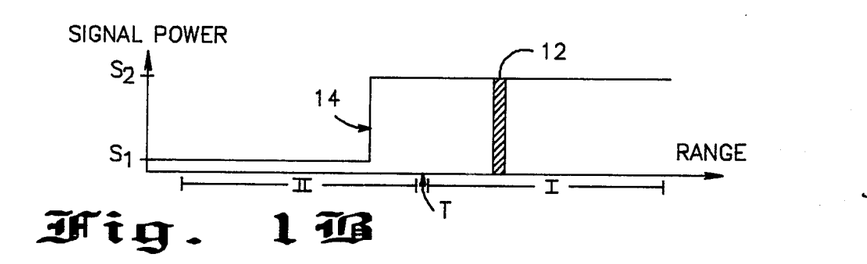
Figure 1C:
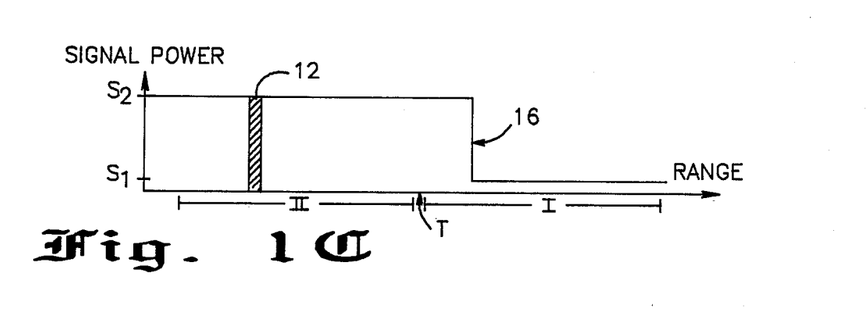
Figure 1D:
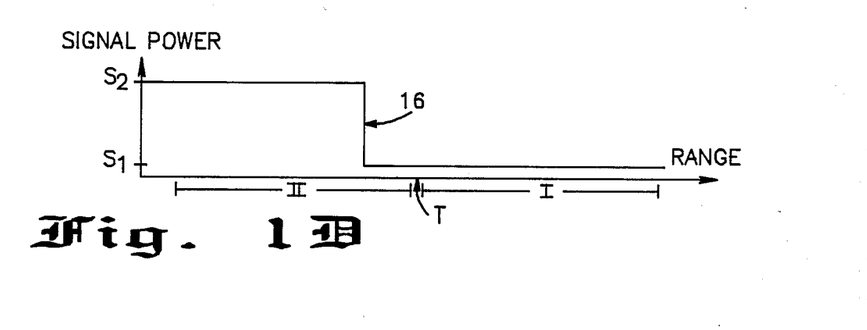

Referring now to FIG. 1B, transition 14 has been shifted through range window I and cell under test T and into range window II. At this point, a pure average CFAR apparatus would still be significantly effected by the range data units in window II having a signal level $S_1$, resulting in a low threshold level and the possibility of false alarms. A "greatest-of" apparatus would have a sufficiently high threshold level to avoid such false alarms. In FIG. 1C, transition 14 has been shifted out of the apparatus and a transition 16 at which the clutter level returns from level $S_2$ to $S_1$ has been shifted into window I. Again, the problem is premature bias. A pure average CFAR apparatus tends to lower the alarm threshold in response to the range data units in window I at a signal level $S_1$ before transition 16 reaches cell under test T, resulting in false alarms. A "greatest-of" CFAR apparatus avoids this problem by calculating the alarm threshold purely from the range data units in window II. However, once transition 16 has passed cell under test T, as shown in FIG. 1D, a "greatest-of" CFAR apparatus tends to set the alarm threshold too high in response to the average of the range data units in window II whereas a pure average CFAR apparatus allows greater sensitivity by also responding to the range data units in window I. The problem then, is in detecting approaching transitions and preventing both premature bias and delayed response.

Figure 2A:
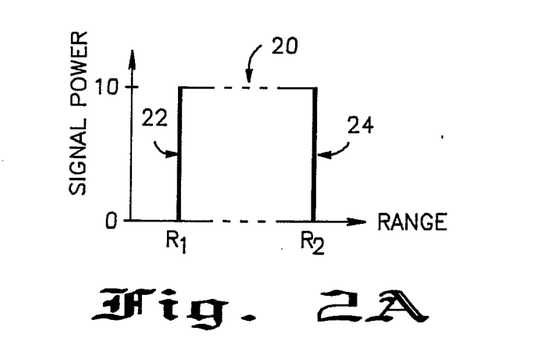
FIG. 2A is a plot of signal power versus range showing an idealized clutter block.

Referring to FIG. 2A, an idealized clutter block 20 is shown in graphic form. At range $R_1$, a transition 22 raises the clutter signal level from zero to ten in some arbitrary units. At range $R_2$ a second transition 24 lowers the clutter level back to zero. It is desired that an easily implementable function be found that will detect transitions 22 and 24. Consider equation (1) as follows:

$$f_l = \frac{(X_{i+l-1} + X_{i+l-2} + \ldots + X_i)}{l} - \frac{(X_{i-1} + X_{i-2} + \ldots + X_{i-l})}{l}$$

Figure 2B:
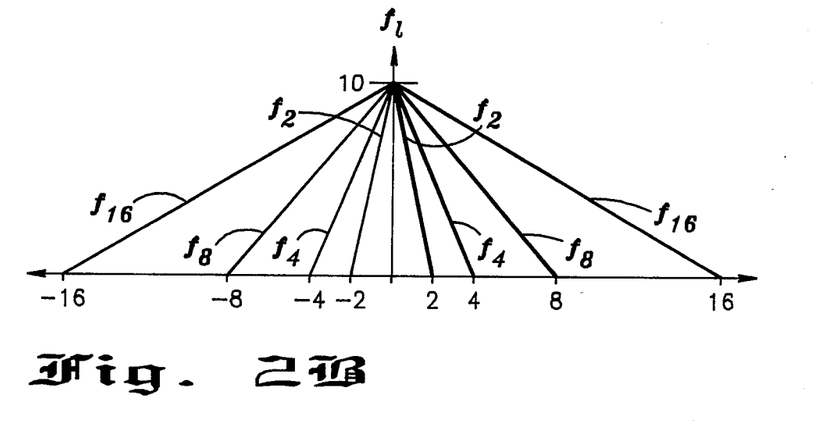
FIG. 2B is a plot of amplitude versus distance from a transition test cell showing various difference window functions.
Figure 2C:
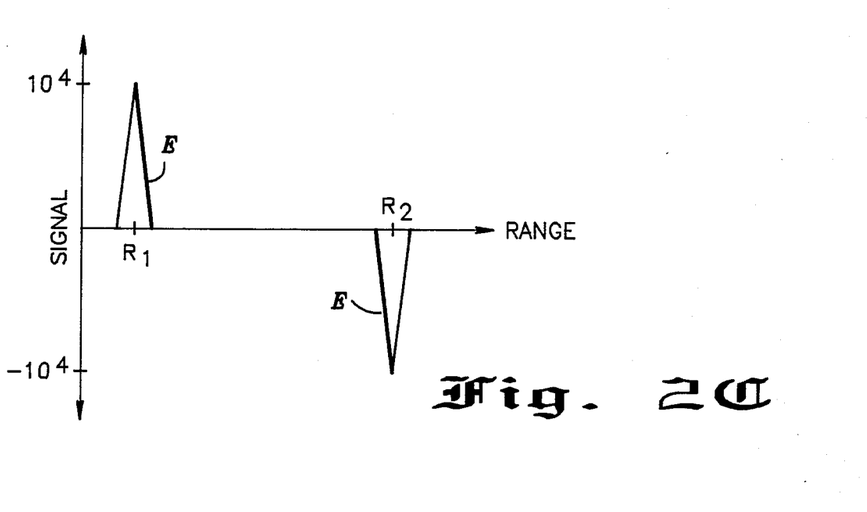
FIG. 2C is a plot of amplitude versus range showing the response of a transition detection function to the clutter block of FIG. 2A.

Equation (1) defines a difference window function of length 2l centered about cell $X_i$. That is, the range data units on both sides of $X_i$ are included in the difference window out to a distance l. The average level of the range data units following $X_i$ is subtracted from the average of the units preceding $X_i$, thus the term *difference window*. The responses of several difference window functions of various lengths are shown in FIG. 2B, which plots $f_l$ versus the distance in range units of a transition such as transition 22 of FIG. 2A from the transition test cell $X_i$. As would be expected, each of the difference window functions has a maximum value equal to the amplitude of the transition (10 in this case) and the maximum value occurs when the transition occurs in the transition test cell $X_i$. The value of each of the functions falls off linearly until the transition is outside the window, thus making the functions fairly inaccurate as locators of a transition. However, consider a function E which is the product of the difference window functions shown in FIG. 2B. The response of this function to the passage of the clutter block of FIG. 2A through the transition test cell $X_i$ is shown in FIG. 2C.

A spike of amplitude $10^4$ is generated at range $R_1$ and at range $R_2$ corresponding to transition 22 and transition 24, respectively. The spike at $R_2$ is negative since transition 24 is a negative one. The width of the spike is determined by the length of the smallest difference window ($f_2$ in this case) since the product cannot rise above zero until all of the factors are non-zero. Since a narrow spike is desirable to precisely locate the transition, E should always include one small window. The contribution of the longer windows (besides building the amplitude of the spike) is best understood with reference to Table I:

TABLE I

| CLUTTER BLOCK LENGTH | $F_2$ (MAX) | $F_4$ (MAX) | $F_8$ (MAX) | $F_{16}$ (MAX) | E (MAX) |
| --- | --- | --- | --- | --- | --- |
| 16 | 10 | 10 | 10 | 10 | $10^4$ |
| 8 | 10 | 10 | 10 | 5 | $5 \times 10^3$ |
| 4 | 10 | 10 | 5 | 2.5 | $1.25 \times 10^3$ |
| 2 | 10 | 5 | 2.5 | 1.25 | $1.56 \times 10^2$ |

If the length of the clutter block, that is the difference between $R_1$ and $R_2$, is less than the length of a particular difference window function, then the maximum value of that function will be less than the amplitude of the transition. This in turn, will result in a lower maximum amplitude of the function E. Therefore, longer difference window functions may be added to the function E to reduce the response of E to very short clutter blocks. Short clutter blocks are more easily averaged out by standard CFAR techniques and very short clutter blocks may be targets which should be detected. The precise choice of the factors of E will be made with consideration of the types of clutter anticipated. As will be described below, an apparatus will be utilized which detects spikes in the function E. This apparatus will also be designed according to the anticipated clutter and with consideration of the particular factors of E used so as to optimally detect transitions. For instance, if it desired that clutter blocks of length less than 8 not be detected, the transition detection apparatus can be designed to ignore values of E less than $5 \times 10^3$. Since CFAR systems are customarily designed by considering the anticipated clutter statistics, the choice of the particular difference window functions and a threshold for E must be made by each system designer.

Figure 3:
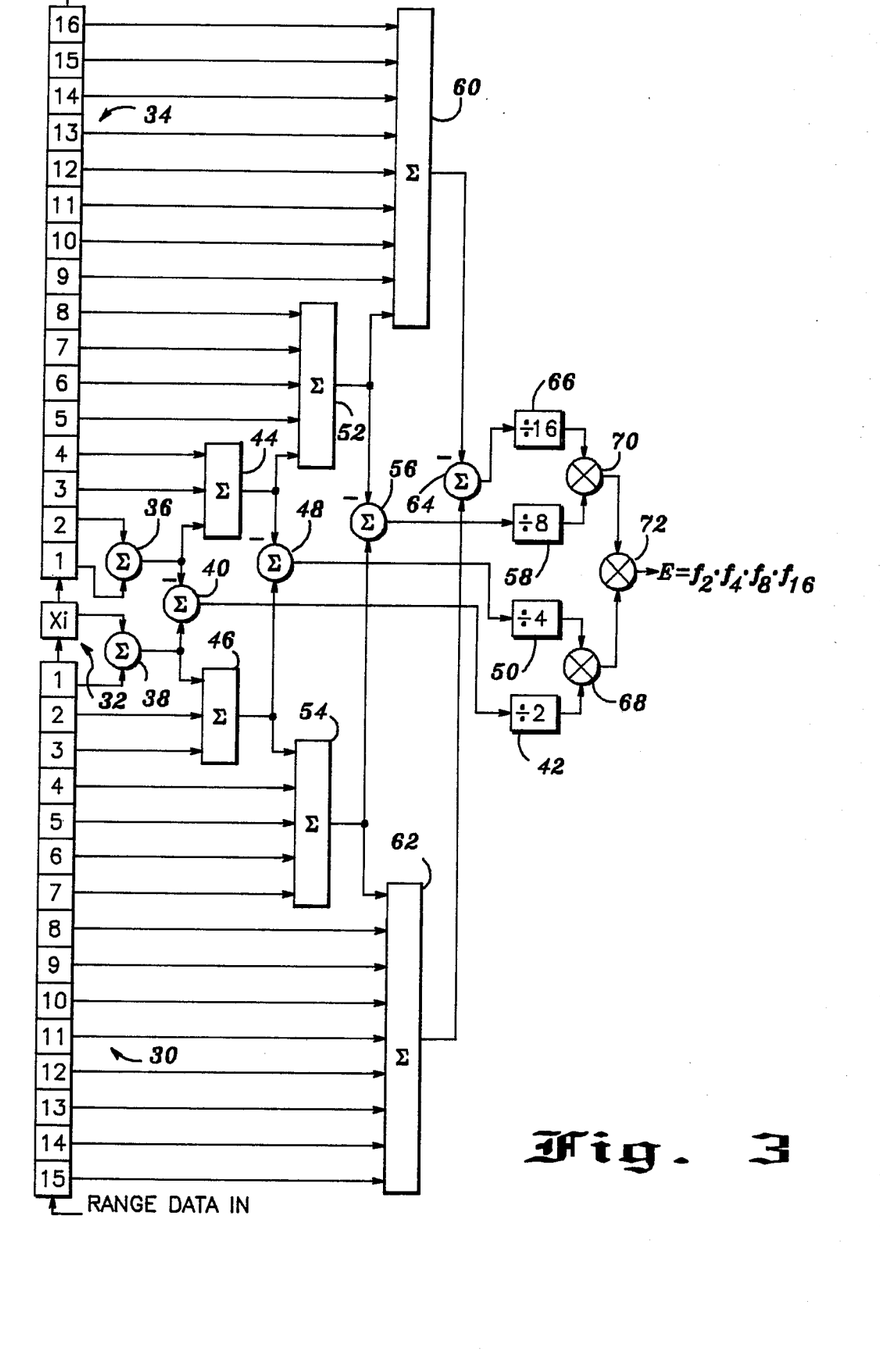
FIG. 3 is a schematic diagram of an apparatus for providing the difference window functions of FIG. 2B and the transition detection function of FIG. 2C.

Referring now to FIG. 3, an apparatus for generating the difference window functions of FIG. 2B is shown in schematic form. Range data units are input serially into a range window 30 comprising 15 range cells. Each range cell is adapted to receive a single range data unit, store it and advance it to the next range cell when a new range data unit is shifted in. If the system is digital, range window 30 is a digital data register. Tapped delay lines are commonly used in nondigital systems. Range cell 1 of range window 30 is coupled to a transition test cell 32, which is designated $X_i$ in accordance with the above difference window function definition. Transition test cell 32 is coupled to range window 34 comprising 16 range cells. The range cells of windows 30 and 34 are numbered 1 through 16 to indicate the distance of the cell from transition test cell 32, again in accordance with equation (1). A range data unit entering range cell 15 of window 30 passes through the successively lower numbered cells of window 30, then into transition test cell 32, then into cell 1 of window 34 and through the successively higher numbered cells thereof and finally is output from cell 16 of window 34.

A first summing circuit 36 has inputs coupled to range cells 1 and 2 of range window 34 and is adapted to sum the range data units stored therein. A second summing circuit 38 has an input coupled to range cell 1 of range window 30 and an input coupled to transition test cell 32 and is adapted to sum the range data units stored therein. A third summing circuit 40 has an input coupled to an output of summing circuit 38 and an inverted input coupled to an output of summing circuit 36 and is adapted to subtract the output of summing circuit 36 from the output of summing circuit 38. A divide-by-two circuit 42 has an input coupled to an output of summing circuit 40. The output of divide-by-two circuit 42 is, therefore, equal to the difference window function $f_2$ as defined by equation (1). A summing circuit 44 has inputs coupled to an output of summing circuit 36, range cell 3 of range window 34, and range cell 4 of range window 34 and is adapted to sum the output of summing circuit 36 with the range data units stored in cells 3 and 4 of range window 34. A summing circuit 46 has inputs coupled to an output of summing circuit 38 and cells 2 and 3 of range window 30 and is adapted to sum the output of summing circuit 38 with the range data units stored in cells 2 and 3 of range window 30. A summing circuit 48 has an input coupled to an output of summing circuit 46 and an inverted input coupled to an output of summing circuit 44 and is adapted to subtract an output of summing circuit 44 from an output of summing circuit 46. A divide-by-four circuit 50 has an input coupled to an output of summing circuit 48, whereby the output of divide-by-four circuit 50 is the difference window function $f_4$. A summing circuit 52 has inputs coupled to an output of summing circuit 44 and range cells 5 through 8 of range window 34 and is adapted to sum an output of summing circuit 44 with the range data units stored in cells 5 through 8 of range window 34. A summing circuit 54 has inputs coupled to an output of summing circuit 46 and cells 4 through 7 of range window 30 and is adapted to sum an output of summing circuit 46 with the range data units stored in cells 4 through 7 of range window 30. A summing circuit 56 has an input coupled to an output of summing circuit 54 and an inverted input coupled to an output of summing circuit 52 and is adapted to subtract an output of summing circuit 52 from an output of summing circuit 54. A divide-by-eight circuit 58 has an input coupled to an output of summing circuit 56, whereby the output of divide-by-eight circuit 58 is equal to the difference window function $f_8$. A summing circuit 60 has inputs coupled to an output of summing circuit 52 and range cells 9 through 16 of range window 34 and is adapted to sum an output of summing circuit 52 with the range data units stored in range cells 9 through 16 of range window 34. A summing circuit 62 has inputs coupled to an output of summing circuit 54 and range cells 8 through 15 of range window 30 and is adapted to sum an output of summing circuit 54 with the range data units stored in range cells 8 through 15 of window 30. A summing circuit 64 has an input coupled to an output of summing circuit 62 and an inverted input coupled to an output of summing circuit 60 and is adapted to subtract an output of summing circuit 60 from an output of summing circuit 62. A divide-by-sixteen circuit 66 has an input coupled to an output of summing circuit 64, whereby the output of divide-by-sixteen circuit 66 is equal to the difference window function $f_{16}$. A multiplying circuit 68 has inputs coupled to the outputs of divide-by-two circuit 42 and divide-by-four circuit 50 and a multiplier circuit 70 has inputs coupled to the outputs of divide-by-eight circuit 58 and divide-by-sixteen circuit 66. A multiplier circuit 72 has inputs coupled to the outputs of multiplier circuit 68 and multiplier circuit 70 whereby the output of multiplier circuit 72 is equal to the transition detection function E which is equal to the product of the difference window functions $f_2$, $f_4$, $f_8$ and $f_{16}$.

The choice of hardware to implement the above described apparatus, as well as various modifications thereto, will be apparent to one skilled in the art.

Figure 4:
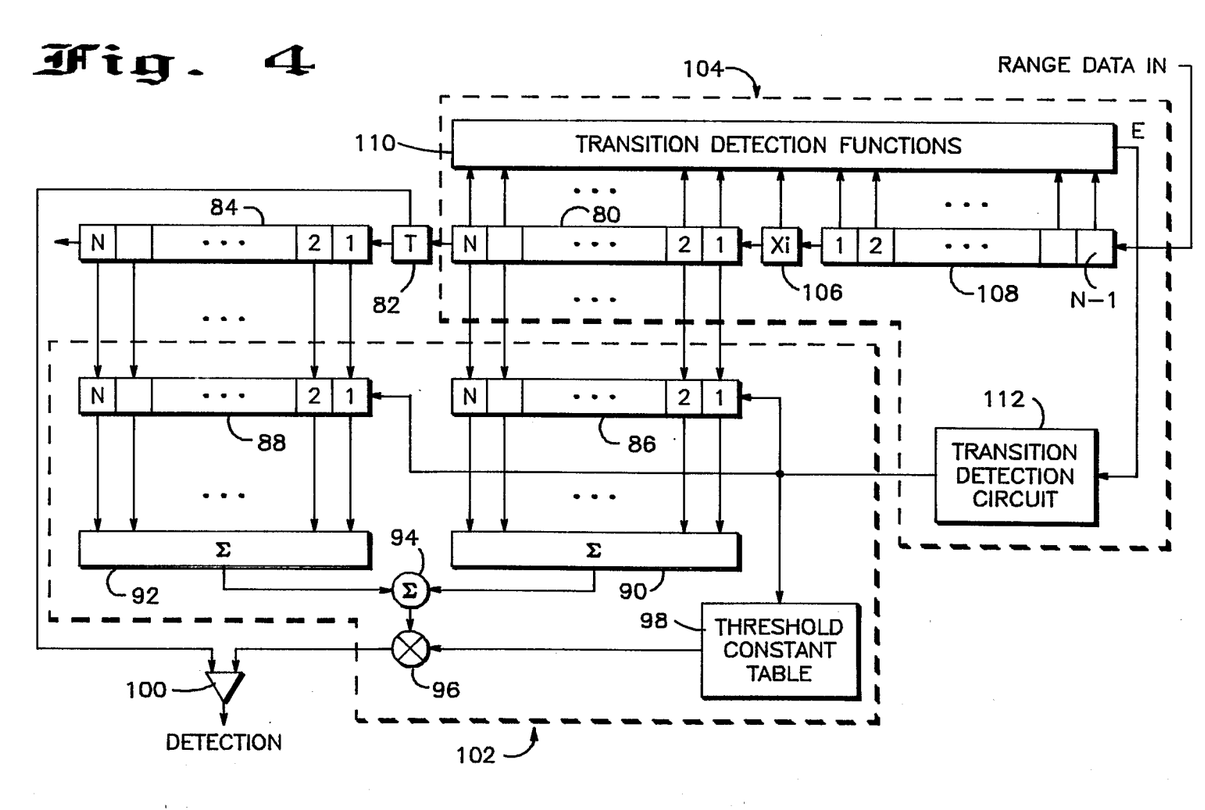
FIG. 4 is a block diagram of an adaptive window CFAR apparatus according to the principles of the present invention.

Referring now to FIG. 4 an adaptive window CFAR apparatus according to the principles of the present invention is shown in block diagram form. A conventional CFAR window comprises a first range window 80 having N cells for receiving, storing and advancing range data units, a cell under test 82 and a second range window 84 having N cells for receiving, storing and advancing range data units. Range data entering window 80 passes through each of the cells thereof, then through cell under test 82, then through each of the cells of window 84. Each of the range cells of window 80 is coupled to one of a first group of switches 86 and each of the range cells of window 84 is coupled to one of a second group of switches 88. All of the switches in first group 86 and second group 88 are initially closed. Each of the switches in first group 86 is coupled to an input of a summing circuit 90, whereby the output of summing circuit 90 is the sum of the range data units in the cells of first window 80. Each of the switches in second group 88 is coupled to an input of summing circuit 92 whereby the output of summing circuit 92 is the sum of the range data units in the cells of second window 84. A summing circuit 94 has inputs coupled to the outputs of summing circuits 90 and 92 whereby the output of summing circuit 94 is the sum of the range data units in first window 80 and second window 84. A multiplier circuit 96 has an input coupled to the output of summing circuit 94 and an input coupled to an output of threshold constant table 98. Threshold constant table 98 provides a threshold constant which, when multiplied with the sum provided by summing circuit 94, produces the desired alarm threshold. The particular threshold constant supplied by table 98 depends on the number of range data units represented by the sum from circuit 94, the type of clutter statistics anticipated and the desired false alarm rate. Many techniques for choosing threshold constants are familiar in the art. A comparator circuit 100 has an input coupled to the output of multiplier circuit 96 and an input coupled to cell under test 82. Comparator 100 compares the alarm threshold provided by multiplier circuit 96 to the range data unit stored in cell under test 82 and indicates a target detection if the range data unit is greater.

To this point what has been described is a fairly conventional pure average CFAR apparatus. Range data units from a first window 80 and a second window 84 are input to an alarm threshold calculation apparatus indicated by dotted line 102. The threshold calculation apparatus sums all of the range data units from the windows, applies a threshold constant and produces an alarm threshold to be compared to the range data unit from cell under test 82.

In addition to what has been described so far the adaptive window CFAR apparatus of FIG. 4 comprises a transition detection apparatus indicated by dotted line 104 which includes first range window 80, a transition test cell 106, a third range window 108 having N−1 range cells, a transition detection function generator 110 and a transition detector circuit 112. Transition test cell 106, each of the range cells of first range window 80 and each of the range cells of third range window 108 are coupled to transition detection function generator 110. Function generator 110 is of the type described above with reference to FIG. 3 and it generates one or more difference window functions and a transition detection function E which is the product of the difference window functions generated. Range data is input initially to cell N−1 of third range window 108 and is then shifted through the apparatus as previously described. When a clutter transition approaches transition test cell 106 transition detection function generator 110 will produce a spike in the transition detection function E. The output of transition detection function generator 110 is coupled to a transition detection circuit 112 which is triggered by a spike in the function E.

As the detected clutter transition leaves transition test cell 106 and enters first range window 80 it would normally begin to bias the alarm threshold. However, transition detection circuit 112 prevents this by opening the first switch in the first group of switches 86, thus preventing the range data unit containing the transition from entering the sum used to calculate the alarm threshold. Furthermore, as the range data unit containing the transition is shifted through first range window 80 and new range data units at the new clutter signal level are shifted in behind it, transition detection circuit 112 opens more of the switches in first group 86 to prevent the premature bias of the alarm threshold towards the new clutter signal level. When the clutter transition is within a few range cells of cell under test 82 the alarm threshold is being calculated almost exclusively using range data units from second window 84 thus allowing greatly increased sensitivity. However, as the clutter transition approaches even closer it is necessary to quickly alter the alarm threshold to reflect the new clutter signal level. To accomplish this transition detection circuit 112 closes all of the switches in first group of switches 86 and opens the switches in second group 88 immediately prior to the entry of the clutter transition into cell under test 82. Consequently the new alarm threshold is set exclusively in response to range data units following the clutter transition. As the clutter transition is shifted through second range window 84 transition detection circuit 112 closes switches in the second group 88, beginning with the first switch in group 88, so as to allow more and more of the range data units following the clutter transition to effect the alarm threshold calculation. As is apparent, the number of range cells coupled to the threshold calculation apparatus varies from 2N to N and back to 2N as the clutter transition passes through the apparatus. This requires variation of the threshold constant used in the threshold calculation to reflect the number of range data units present in the sum at any one time. To accomplish this transition detection circuit 112 is coupled to threshold constant table 98 so that the correct threshold constant is supplied to multiplier circuit 96 at all times. Transition detection circuit 112 passes to table 98 a number representing the number of switches currently closed and table 98 simply looks-up the proper constant which has been previously calculated and stored. The detailed operation of transition detection circuit is best understood by reference of FIG. 5.

Figure 5:
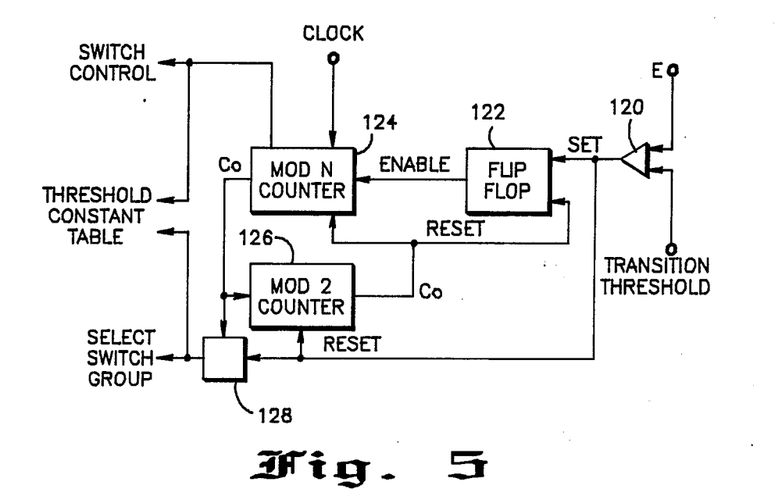
FIG. 5 is a block diagram of a transition detection circuit according to the principles of the present invention.

Referring to FIG. 5 a transition detection circuit is shown in block diagram form. A comparator 120 has an input coupled to transition function generator 110 (FIG. 4) and an input coupled to a transition threshold. An output of comparator 120 is coupled to a SET input of a flip-flop circuit 122. An output of flip-flop circuit 122 is coupled to an ENABLE input of a modulo N counter 124. A CLOCK input of modulo N counter 124 is coupled to the same clock signal which shifts range data units through the apparatus of FIG. 4. A carryover (CO) output of modulo N counter 124 is coupled to a clock input of a modulo 2 counter 126. A carryover (CO) output of modulo 2 counter 126 is coupled to RESET inputs of modulo N counter 124 and flip-flop circuit 122. A toggle circuit 128 has an input coupled to the carryover output of modulo N counter 124. A RESET input of toggle circuit 128 is coupled to the output of comparator 120, which is also coupled to a RESET input of modulo 2 counter 126. An output of toggle circuit 128, which comprises either a logical "1" or a logical "0", is coupled to first and second switch groups 86 and 88 (FIG. 4) and operates to select which of the switch groups will respond to the count from modulo N counter 124. The count from modulo N counter 124 is also coupled to switch groups 86 and 88. When the output of toggle circuit 128 is 0 first switch group 86 responds by opening a number of switches, counting from right to left, equal to the count from modulo N counter 124. The remaining switches in first group 86 and all of the switches in second group 88 are closed. When the output of toggle circuit 128 is 1 the second switch group 88 will respond by closing a number of switches, counting from right to left, equal to the count from modulo N counter 124. The remainder of the switches in second group 88 are open and all of the switches in first group 86 are closed. Both the select switch group and switch control outputs are also coupled to threshold constant table 98 to indicate the number of closed switches, upon which the proper threshold constant is based.

In the absence of a detected clutter transition, modulo N counter 124 is set at a count of 0 and toggle circuit 128 is providing a select switch group output of 0, thus closing all of the switches in both groups. Modulo 2 counter 126 is also set at 0 and module N counter 124 is disabled. The transition threshold is chosen with regard to the anticipated clutter, the desired performance of the CFAR apparatus and the factors chosen for the transition detection function E. When a spike, either positive or negative, in E exceeds the transition threshold, comparator 120 is triggered and acts through flip-flop circuit 122 to enable modulo N counter 124. Each subsequent clock cycle, in addition to shifting the detected transition one cell further through the apparatus, increments the count in modulo N counter 124 by one and opens another switch in first group 86, thus preventing the transition from effecting the alarm threshold. Also, the threshold is updated to reflect the number of closed switches. At the Nth clock cycle, when the transition is shifted into the range cell immediately preceding the cell under test, modulo N counter 124 rolls over and provides a carryover signal which changes toggle circuit 128 to the 1 position and increments modulo 2 counter 126 by one. All of the switches in first group 86 are closed and all of the switches in second group 88 are opened in response to the new select switch group and switch control signals. At this point, the alarm threshold is calculated using only range cells following the transition. Modulo N counter 124 continues to be enabled, so that subsequent clock cycles close successive switches in second group 88 and update the threshold constant. When modulo N counter 124 again reaches 0, the carryover output will roll over modulo 2 counter 126, which provides a carryover output to reset modulo N counter 124 and flip-flop circuit 122, thus returning the entire transition detection circuit to its initial state.

While the invention has been particularly shown and described with reference to a preferred embodiment thereof it will be understood by those skilled in the art that various other modifications and changes may be made to the invention without departing from the spirit and scope thereof.

I claim:

1. An adaptive window CFAR apparatus comprising: first window means for receiving, storing and advancing a predetermined number of range data units;
   cell under test means coupled to said first window means for receiving a single range data unit therefrom, storing said range data unit and advancing said range data unit;
   second window means coupled to cell under test means for receiving from said cell under test means, storing and advancing a predetermined number of range data units;
   transition test cell means for receiving, storing and advancing a single range data unit, said transition test cell being coupled to said first window means;
   third window means for receiving, storing and advancing predetermined number of range data units, said third window means being coupled to said transition test cell means;
   means coupled to said first and third window means for generating at least two difference window functions, each of said functions being centered about said transition test cell means and having a predetermined length;
   means for multiplying said at least two difference window functions together;
   transition dectection means coupled to said means for multiplying;
   alarm threshold calculation means coupled to said first and second window means for calculating an alarm threshold, said calculation means being responsive to said transition detection means to remove certain of said range data units in said first and second window means from said calculation; and
   comparator means for comparing said range data unit stored in cell under test means with said alarm threshold.

2. An adaptive window CFAR apparatus according to claim 1 wherein said alarm threshold calculation means further comprises:
   first switch means coupled to said first window means;
   second switch means coupled to said second window means;
   summation means coupled to said first and second switch means for summing said range data units from said first and second window means, said first and second switch means being responsive to said transition detection means for removing certain of said range data units from said summation;
   table means responsive to said transition detection means for providing a threshold constant which reflects a number of range data units summed by said summation means; and
   multiplier means coupled to said summation means and said table means for providing said alarm threshold.

3. An adaptive window CFAR apparatus comprising:
   a first window comprising a plurality of range cells, said first window being adapted to receive range data units at an input end thereof, to advance said units through each of said cells and to output said units at an output end thereof;
   a cell under test coupled to said output end of said first window;
   a second window comprising a plurality of range cells, said second window being adapted to receive range data units from said cell under test at an input end of said second window, to advance said units through each of said cells and to output said units at an output end thereof;
   a transition test cell coupled to said input end of said first window;
   a third window comprising a plurality of range cells, said third window being adapted to receive range data units at an input end thereof, to advance said data units through each of said cells and to output said units at an output end thereof, said output end being coupled to said transition test cell;
   means coupled to said first and third windows for generating at least two difference window functions, each of said function being centered about said transition test cell and having a predetermined length;
   means for multiplying said at least two difference window function together;
   transition detection means coupled to said means for multiplying;
   alarm threshold calculation means coupled to said first and second windows for calculating an alarm threshold, said calculation means being responsive to said transition detection means to remove certain of said range data units stored in first and second windows from said calculation; and
   comparator means for comparing said range data unit stored in cell under test with said alarm threshold.

4. An adaptive window CFAR apparatus according to claim 3 wherein said alarm threshold calculation means further comprises:
   first switch means coupled to said first window;
   second switch means coupled to said second window;
   summation means coupled to said first and second switch means for summing said range data units stored in said range cells in said first and second window means, said first and second switch means being responsive to said transition detection means to decouple certain of said range cells from said summation means; and
   table means responsive to said transition detection means for providing a threshold constant which reflects a number of said range cells coupled to said summation means; and multiplier means coupled to said summation means and said table means for providing said alarm threshold.

5. A method of CFAR radar detection comprising the steps of:

serially receiving a stream of range data units;
calculating at least two difference window functions;
multiplying said difference window functions to form a transition detection function;
detecting a spike in said transition detection function;
calculating an alarm threshold from said range data units;
removing from said calculation certain of said range data units in response to said spike in said transition detection function; and
comparing said alarm threshold to a particular one of said range data units.

* * * * *